May 14, 1957 A. RODEL 2,792,041
FOOD SLICING APPARATUS HAVING BLADES IN HORIZONTAL PLANE
Filed April 15, 1955 3 Sheets-Sheet 2
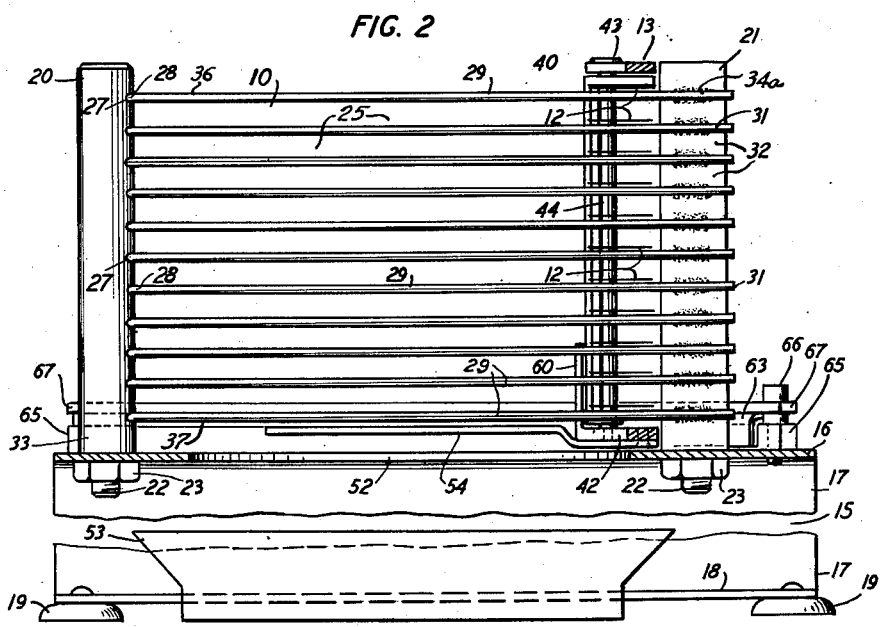
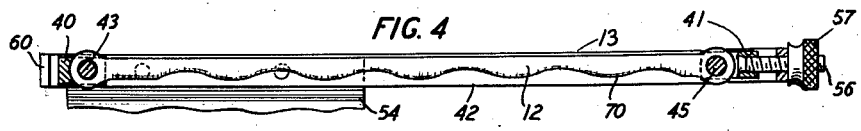
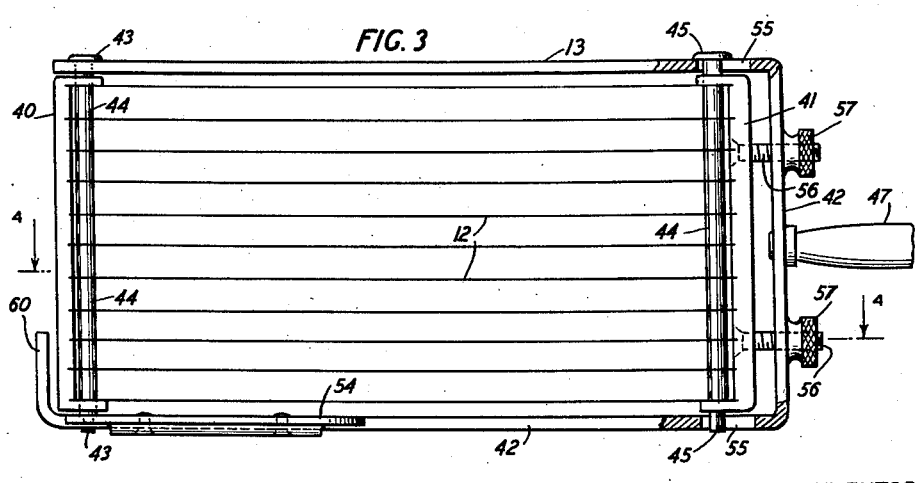
INVENTOR
ALBERT RODEL
BY Patrick J. Roche
ATTORNEY May 14, 1957  A. RODEL  2,792,041
FOOD SLICING APPARATUS HAVING BLADES IN HORIZONTAL PLANE
Filed April 15, 1955  3 Sheets-Sheet 3
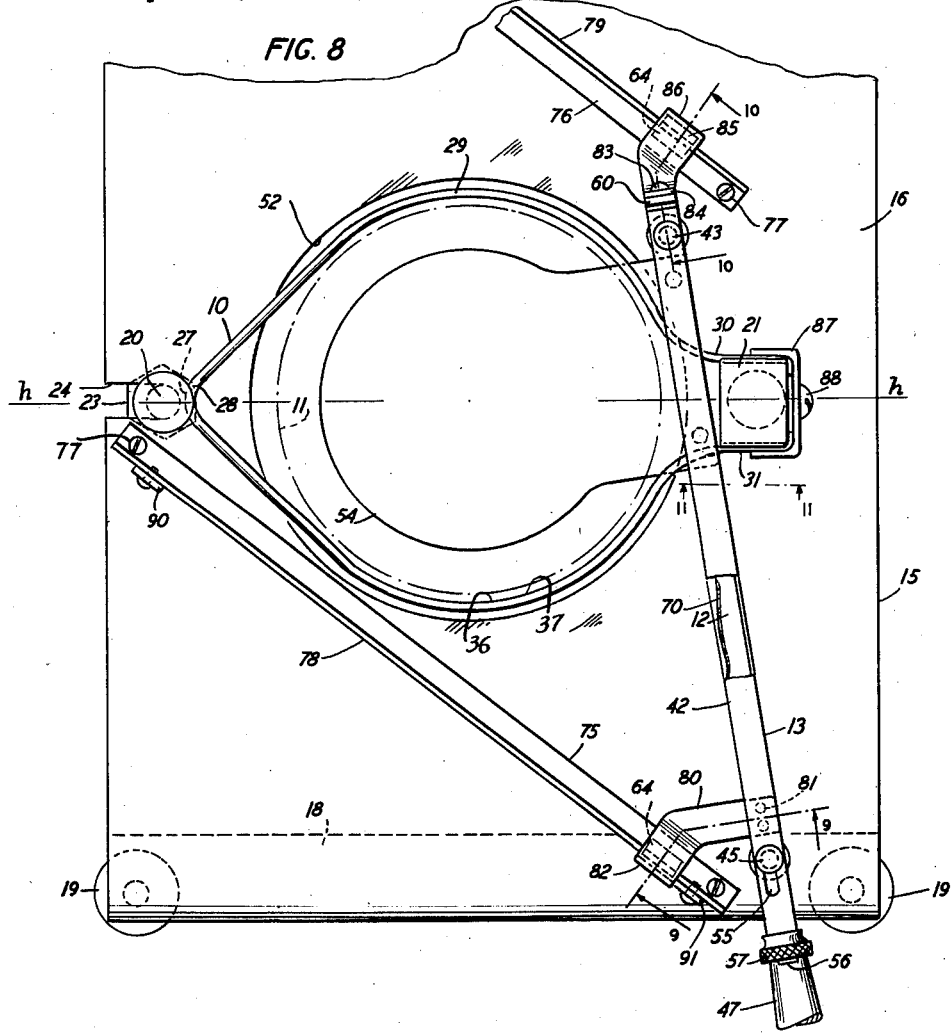
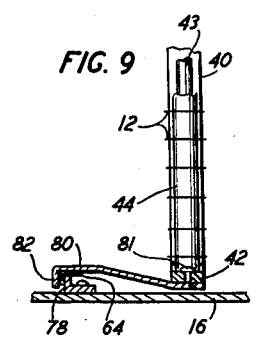
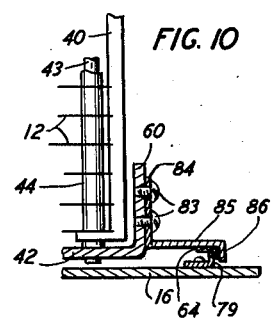
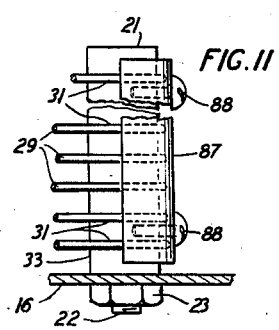
INVENTOR
ALBERT RODEL
BY Patrick J. Roche
ATTORNEY

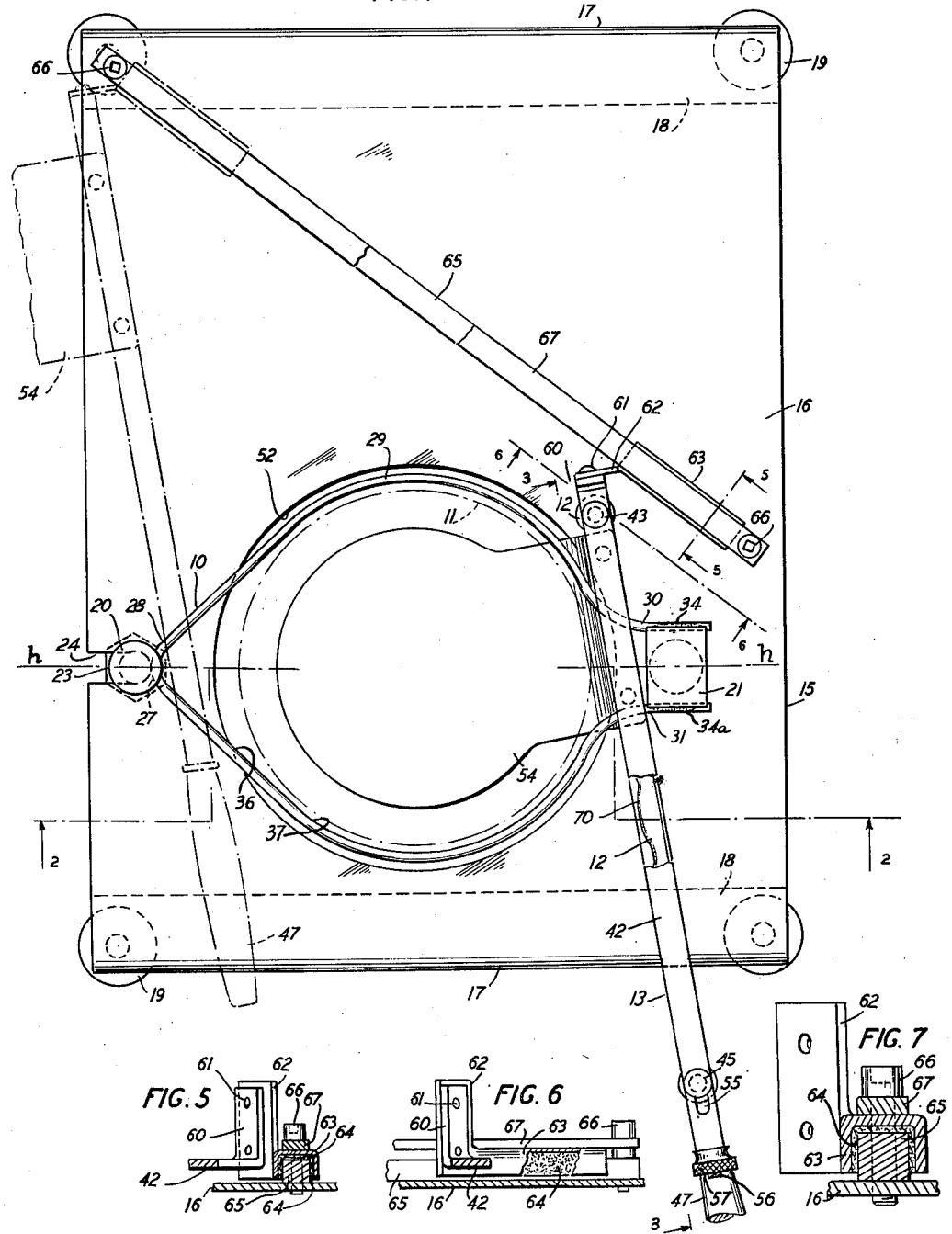

United States Patent Office 2,792,041
Patented May 14, 1957

2,792,041

FOOD SLICING APPARATUS HAVING BLADES IN HORIZONTAL PLANE

Albert Rodel, New York, N. Y.

Application April 15, 1955, Serial No. 501,479

12 Claims. (Cl. 146—151)

This invention relates to improvements in food slicing apparatus, and specifically to such apparatus for slicing tomatoes and the like.

Heretofore, devices operated by hand for slicing tomatoes, for example, comprised a plurality of knives operated as a unit in such manner as to pierce the skin of the tomato as an initial step and then to slice the pulp as the final step. The aspect of piercing the skin without crushing the tomato or causing squirting was found to be a problem, particularly where the strength of the person operating the cutting apparatus was a factor in regard to such aspect. When such person was not careful, the resulting sliced tomatoes were damaged and thereby rendered unsightly from an appearance standpoint for use in salads or the like in so-called quality eating establishments.

As one solution in the prior art, each cutting edge was provided with a sharp point from which the cutting edges sloped away. The tomato was so positioned that the cutting edges were effectively lowered downwardly from an initial position thereabove. As another solution in the prior art, the cutting edges were serrated, and moved in a horizontal direction into engagement with the tomato to be sliced. Unless the person operating such cutting devices exercised some care in regard to the degree of hand power applied to the knives in the cutting strokes, it would be inevitable that the tomato would be partially crushed and/or caused to squirt juice both of which aspects were found to be undesirable.

The present invention contemplates an apparatus for expeditiously slicing food in response to a hand operation.

A main object of the invention is to control in a positive manner the hand pressure applied to a plurality of cutting knives operating as a unit during its movement in a cutting stroke to slice a tomato thereby tending to obviate crushing the tomato.

Another object is to regulate in a positive sense the magnitude of a cutting thrust during the slicing of a tomato in order to minimize squirting of the juice therefrom.

Another object is to slice a tomato with a facile operation.

A further object is to automatically remove a sliced tomato from the proximity of the cutting knives substantially at the moment when the tomato is entirely sliced.

Another object is to provide the cutting edges of the knives with such wavy configuration as tends to accommodate the periphery of the average sized tomato whereby the skin of a tomato is expeditiously pierced as an initial step in the slicing thereof.

In association with an enclosure comprising a plurality of circular wires superposed in a vertically spaced direction on a rectangular base and formed substantially in a pear shape in a horizontal plane for containing the food to be sliced, and a group of knives superposed in a vertically spaced relation on a holder and disposed in an operative relation with the wire enclosure in such manner that each knife is movable in a horizontal plane between two adjacent wires to slice the food, the present invention comprises an elongated rail positioned substantially in an oblique direction relative to an axis of the wire enclosure and extending upwardly from right to left, and a U-shaped member disposed in an inverted position on an upper surface of the rail and adapted for slidable movement thereon and in frictional engagement therewith. An end of the U-shaped member is rigidly attached to the nearest end of the knife holder. Thus, the knives are caused to move as a unit in a positive forward oblique thrust against the tomato to be sliced under control of the frictional engagement of the U-shaped member with the guide rail. This tends to provide evenly cut slices substantially with minimum crushing of the food and at the same time tending to minimize a squirting of juice therefrom.

A feature of the invention involves a cover plate adapted to constitute a bottom for the wire enclosure before the slicing of the food and movable simultaneously with the knife holder so as to render the wire enclosure effectively bottomless after the food has been fully sliced and thereby permitting the sliced food to fall out of the wire enclosure and through a registering opening in the base into a container positioned therebelow.

Another feature concerns a plurality of cutting knives each of which is provided with a wavy cutting surface comprising a plurality of connected arcuate sections each of which substantially accommodates a portion of the peripheral surface of the food such, for example, as a tomato to facilitate the initial piercing of the tomato skin while at the same time tending to minimize a squirting of juice from the tomato during the slicing action.

Still another feature relates to the use of a frictional device for controlling the magnitude of the thrust of the knife blades during the cutting strokes whereby the cutting action may be so regulated as to minimize and/or obviate crushing the food during the initial and/or subsequent cutting action.

Still another feature is directed to an adjustable holder for the cutting knives whereby the respective knives may be provided with predetermined amounts of tension from time to time so as to expedite the slicing of the food without damage thereto and/or a squirting of the juice therefrom.

A further feature involves the continuous maintenance of an operative relationship between the wire enclosure and cutting knives at all times.

A modification concerns the use of two guide rails for controlling the movements of the knife holder in both cutting and non-cutting strokes.

The invention will be readily understood from the following description when taken together with the accompanying drawing in which:

Fig. 1 is a plan view showing a specific embodiment of the invention;

Fig. 2 is an elevational view taken along the line 2—2 in Fig. 1;

Fig. 3 is an elevational view taken along the line 3—3 in Fig. 1;

Fig. 4 is a fragmentary plan view taken along the line 4—4 in Fig. 3;

Fig. 5 is an enlarged fragmentary elevational view taken along line 5—5 in Fig. 1;

Fig. 6 is an enlarged fragmentary elevational view taken along line 6—6 in Fig. 1;

Fig. 7 is an enlarged view, with parts omitted, approximately of Fig. 5;

Fig. 8 is a plan view of a modification of the specific embodiment of the invention shown in Fig. 1;

Fig. 9 is a fragmentary sectional view taken along line 9—9 in Fig. 8;

Fig. 10 is a fragmentary sectional view taken along line 10—10 in Fig. 8; and

Fig. 11 is a fragmentary elevational view taken along line 11—11 in Fig. 8.

Referring to Figs. 1, 2 and 3, an enclosure 10 contains food 11 such, for example, as a tomato or the like which is to be sliced by a plurality of knives 12 spaced vertically in a holder 13 and actuated through the enclosure and food in a manner which will be subsequently explained. A base 15 for supporting the food enclosure and knives comprises a rectangular upper surface portion 16 each of whose opposite narrow sides is formed with an integral leg 17, turned in and extending back under the upper surface portion to provide a section 18 parallel therewith. A plurality of well-known suction cups 19, 19 of rubber or the like is positioned under at least the under surfaces of the opposite ends of both bent back sections 18 for supporting the base on a table top, not shown, or other suitable horizontal surface. The vertical length of the legs 17, 17 may be predetermined to position the base a preselected distance above the table top for a purpose that will later appear.

The food enclosure comprises a pair of pedestals 20 and 21 spaced in a horizontal direction on a narrow dimension of the upper surface portion of the base so that each pedestal is disposed in proximity of one side of longer dimension of the base. Both pedestals are provided with lowermost treaded portions 22, 22 for receiving nuts 23, 23 whereby the pedestals may be removably secured to the base. Pedestal 20 is mounted on the upper surface portion via slot 24 and is slidable therein for a purpose that will be subsequently mentioned. Pedestal 21 is fixedly mounted in a suitable aperture, not shown, provided in the upper surface portion. The portions of the peripheral surface of pedestal 20 facing pedestal 21 is provided with a plurality of vertically superposed spaced grooves 27, 27 each of which is equally spaced from adjacent grooves and accommodates snugly an arcuate central portion 28 of a relatively stiff round wire 29.

The opposite ends 30 and 31 of the respective wires are preferably soldered at sections 34 and 34a, respectively, or otherwise fixedly positioned in vertically superposed spaced relation on pedestal 21. It will be understood that the vertical spacing of the respective grooves in pedestal 20 and the associated spaces between adjacent plates 32, 32 on the pedestal 21 accommodating the individual wires are so relatively superposed in a vertical direction in parallel horizontal planes that each wire lies substantially in parallel relation with adjacent wires and further so that all wires are superposed substantially in parallel relation with the upper surface portion of the base. Also, it will be understood that the relative spacing of the grooves in pedestal 20 and the thickness of the plates 32, 32 on pedestal 21 are so correlated that preselected equal amounts of space 25, 25 occur between adjacent wires. The wires when properly mounted have substantially a pear shape to constitute the enclosure 10 provided with top and bottom openings 36 and 37, respectively, of identical configurations for purposes that will later appear, as shown in Fig. 1. Each pedestal includes a shank 33 to dispose the lowermost wire a predetermined distance above the upper surface portion of the base for a purpose that will be subsequently mentioned.

The respective knives in the holder comprise relatively thin and narrow metallic strips spaced from each other and superposed in a vertical plane as illustrated in Fig. 3. For this purpose, the knife holder comprises yokes 40 and 41 mountable in spaced relation in the plane of and between the opposite ends of a substantially U-shape frame 42 in a manner which will now be explained. An elongated pin 43 disposed in proximity of the open end of the frame serves to support the opposite ends of yoke 40 and the corresponding ends of the knives disposed in superposed spaced relation therebetween via a plurality of suitable superposed spacers 44, 44. An elongated pin 45 is slidably disposed adjacent the closed end of the frame for a purpose that will be pointed out later. The pin 45 serves to support the opposite ends of yoke 41 and the corresponding ends of the knives arranged in superposed spaced relation therebetween via the superposed spacers 44, 44. Thus, each knife is equally spaced from adjacent knives for a purpose that will be presently mentioned. A handle 47 attached to a midpoint of the closed end of the frame enables the hand actuation of the knife holder in cutting and non-cutting strokes in a manner mentioned below.

The knife holder is operatively mounted adjacent the spacer wires of the food enclosure as follows: Let it be assumed initially that the food enclosure is assembled as shown in Figs. 1 and 2. Next the nut on pedestal 20 is loosened and the latter pedestal is then moved in a lefthand direction in slot 24 until entirely disengaged from the base. At this time, it will be apparent that the wires are held in superposed spaced relation by the structure of pedestal 21. The knife holder positioned at the lefthand or open ends of the wires is moved toward the pedestal 21 in such manner that each knife is disposed between two adjacent wires. Due to the preselected spacing between adjacent wires, each knife is freely slidable therebetween.

In accordance with the present invention, the above-described food slicing structure is provided with the following three improvements which will now be described. A first improvement involves a removable bottom for the wire enclosure whereby the sliced food may be expeditiously removed therefrom and made available to the ultimate user. For this purpose, the base is formed with an opening 52 having a dimension substantially equivalent to the bottom opening of the wire enclosure as illustrated in Figs. 1 and 2. A receptacle 53 positioned on a table top directly below the opening 52 serves to catch the food when sliced in a manner which will be subsequently explained. A cover plate 54 attached to a lowermost portion of the U-shape frame 42 is normally interposed between the bottom opening of the wire enclosure and the base opening as delineated in Figs. 1, 2, 3 and 4 when the knife holder has been properly disposed on the base in an operative position which will be described below. Thus, the cover plate serves effectively as a removable bottom for the food enclosure as will presently become apparent.

A second improvement shown in Figs. 3 and 4 concerns an adjustable mechanism which enables the knives to be provided with such amount of tension as will permit an expeditious slicing of the food. Referring to the latter figures, pin 45 has its opposite ends mounted in slots 55, 55 for slidable movement in a direction coincident with the longer dimension of the knife holder. Threaded studs 56, 56 mounted rigidly in spaced relation transversely of yoke 41 project slidably through suitable apertures, not shown, formed in the closed end of U-shape frame 42. The free ends of the studs projecting beyond the frame 42 carry knurled finger nuts 57, 57. It will be apparent that appropriate adjustments of the finger nuts in clockwise or counter-clockwise directions will cause yoke 41 to slide in slots 55, 55 in a righthand or lefthand direction as illustrated in Fig. 3 whereby a predetermined amount of cutting tension may be initially established in the respective knife blades included in the knife holder. This tends to obviate crushing of the peripheral surface of the food at those points at which the knives make their initial contacts in the cutting strokes of the knife holder, and thereby tends to enable an expeditious cutting of the food into so-called "clean" slices.

A third improvement is directed to a positive control of the thrust of the knife holder during the food cutting strokes. Referring to the several figures of the drawing, U-shape frame 42 is formed with an integral extension 60 bent back in the plane of the closed end thereof as shown in Figs. 1 and 3. Attached to the frame extension by suitable screws 61 is a lug 62 formed integral with an end of an inverted U-shape member 63. Interiorly of the latter member is positioned an absorbent textile lining 64 adapted to receive and retain a suitable lubricant for a purpose that will presently appear. The inverted U-shape member 63 is disposed on an upper surface of rectangular rail 65 in such manner that the textile lining is located therebetween. Rail 65 is disposed on the upper surface portion of the base approximately at a 45-degree angle relative to a horizontal axis h—h of the wire enclosure, and is secured to the base via screws 66, 66 located adjacent the opposite ends of the rail and firmly engaging the upper surface of the base so that the rail is immovably secured thereto. This rail being disposed at an angle oblique to the horizontal axis of the wire enclosure because of the 45 degree angular disposition of such rail with respect to the last-mentioned axis serves to impart oblique movements to the cutting knives as hereinafter mentioned.

A rectangular bar 67 positioned on the uppermost surface of the inverted U-shaped member 63 is retained thereon via the screws 66, 66. The bar 67 serves to ensure a firm engagement between U-shape member 63 and guide rail 65 during both the cutting and non-cutting strokes of the knife holder as will be presently mentioned. Thus, the knife holder is so supported on the base as to provide and maintain adequate clearance between the knives and the enclosure wires as to permit expeditious movements of the knives therebetween for the purpose mentioned below. In this connection, it will be observed that the respective knives are formed with wavy cutting edges 70 having a preselected curvilinear shape to facilitate the food-cutting action which will be presently described.

The operation of the improvement according to the present invention will now be explained: It will be initially assumed that the overall structure has been assembled as illustrated by the full lines in the several figures of the drawing. This means that the knife holder has completed its full movement toward the righthand in response to the last non-cutting stroke; that the cover plate has been disposed directly underneath the bottom opening of the wire enclosure containing the food to be sliced; and that a receptacle has been positioned immediately below the opening in the base and therefore immediately below the cover plate.

Assuming further a tomato or the like has been placed within the wire enclosure via the top opening thereof and now rests on top of the cover plate. Next, an operator grasps the handle of the knife holder and actuates the latter in a generally oblique direction from right to left with respect to the horizontal axis of the wire enclosure until the cutting edges of the knives engage initially the surface of the food to be sliced. As a consequence of and depending on the size of the food to be cut, the latter is gradually urged into contact with the far sides of the wires of the enclosure thereby tending to resist further actuation of the knife holder. Then the operator continues to actuate the knife holder in the oblique direction with a positive thrust under control of inverted U-shape member 63 sliding on rail 65. In due course, the wavy cutting edges of the knives tend to facilitate the initial piercing of the skin of the food and cut thereinto. This is substantially expedited by the fact that the wavy cutting edge of each knife is formed with a plurality of arcuate or curvilinear sections, each arcuate section being connected with adjacent sections and so proportioned as to accommodate itself expeditiously to a particular peripheral portion of the average sized food to be sliced. Further actuation of the knife holder in the oblique direction from right to left as above-mentioned will enable the knives to cut into the pulp of the tomato, and eventually to cut the entire tomato into slices when the knife holder has completed its cutting stroke as shown by its position indicated by the dot-dash lines in Fig. 1. During the foregoing actuation of the knife holder it will be apparent that the cover plate is carried therewith to gradually permit registration between the opening at the bottom of the wire enclosure and the opening in the base so that when the knife holder has completed its cutting stroke, full registration between those two openings is entirely effected whereby the fully sliced tomato drops through the opening in the base and is collected in the receptacle therebelow. Thereafter, the knife holder is actuated in a non-cutting stroke or opposite oblique direction, viz., from left to right with respect to the horizontal axis of the wire enclosure, to the position shown by the full lines in Fig. 1, in preparation for the next succeeding cutting stroke. Thus, the cutting knives are continuously maintained in an operative relationship with the wire enclosure at all times, and have oblique movements imparted thereto during cutting and non-cutting strokes under control of the guide rail 65. It will be apparent that the receptacle collecting the sliced tomato also collects at the same time any juices resulting from the slicing operation, particularly when a relatively large number of discrete tomatoes are sliced at a given time as required in the case of hotels, hospitals, military installations, restaurants or the like.

A modification shown in Figs. 8, 9, 10 and 11 includes elements common with the specific embodiment disclosed in Figs. 1 through 7 as identified with corresponding reference numerals. In the modification, a pair of triangular guide rails 75 and 76 are attached to the upper surface of the base approximately at a 45-degree angle relative to a horizontal axis h—h of the wire enclosure shown in Fig. 8 via suitable screws 77, 77 in such manner that vertical legs 78 and 79, respectively, are disposed in parallel relation.

An angular member 80 has one end firmly attached to an under surface of one end of U-shape frame 42 via suitable screws 81, 81 and an opposite end formed with a depending portion 82 to constitute effectively an inverted L-shape portion disposed adjacent vertical leg 78 for slidable movement thereon as shown in Figs. 8 and 9. Interposed between the last-mentioned L-shape portion and the top of vertical leg 78 is an absorbent textile lining 64 for substantially minimizing friction therebetween.

Referring now to Figs. 8 and 10, extension 60 on the opposite end of U-shape frame 42 has rigidly secured thereto via suitable screws 83, 83 an upstanding end 84 of angular member 85. The latter has its opposite end with a depending portion 86 to form substantially an inverted L-shape portion positioned adjacent vertical leg 79 for slidable movement thereon. Interposed between the last-mentioned L-shape portion and the top of vertical 79 is absorbent textile lining 64 for substantially minimizing friction therebetween.

A suitable stop 90 fastened to one end of vertical leg 78 limits the forward movements of the knife holder in cutting strokes and a similar stop 91 limits the opposite movements thereof in non-cutting strokes.

As illustrated in Figs. 8 and 11, ends 30 and 31 of wires 29 disposed in the superposed spaced grooves 27, 27 of pedestal 21 are detachably held therein by U-shape member 87 and screws 88, 88.

The operation of the modification according to Figs. 8, 9, 10 and 11 is substantially identical with that involving the specific embodiment shown in Figs. 1 through 7 except in the modification the two guide rails serve to control the positive thrust of the knives through the food to be sliced.

It will be understood that the specific embodiment and modification disclosed herein are utilized to illustrate the invention, and are not to be limited thereto except in the sense set forth in the appended claims.

What is claimed is:

1. Apparatus for slicing food comprising a base, a plurality of wires superposed in vertically spaced relation on said base, said wires being so shaped in a horizontal plane as to constitute an enclosure for said food, a plurality of knives superposed vertically in spaced relation, each knife being movable between two adjacent wires from one side of said wire enclosure to another side thereof in cutting and non-cutting strokes for slicing said food in said wire enclosure, and means rigidly attached to said knives and slidably movable on at least one portion of said base disposed at an angle oblique to a horizontal axis of said wire enclosure for imparting corresponding oblique movements to said knives between said wires during the cutting and non-cutting strokes of said knives, said movable means sliding from right to left on said one base portion in cutting strokes and in the opposite direction thereon in non-cutting strokes for imparting the corresponding oblique movements to said knives.

2. The food cutting apparatus according to claim 1 in which said last-mentioned means comprises guide means disposed on said one base portion disposed at said angle oblique to said horizontal axis of said wire enclosure, and means rigidly attached to said knives and slidably movable on said guide means whereby corresponding oblique movements are imparted to said knives during the cutting and non-cutting strokes thereof.

3. The food slicing apparatus according to claim 2 in which said guide means is disposed on said one base portion at an angle of the order of 45 degrees relative to said horizontal axis of said wire enclosure, and said slidable means is slidably movable on said 45-degree guide means for imparting corresponding angular movements to said knives during the cutting and non-cutting strokes thereof.

4. The food slicing apparatus according to claim 1 in which said last-mentioned means comprises an elongated bar disposed in a horizontal plane and attached to said one base portion at an angle of approximately 45 degrees relative to said horizontal axis of said wire enclosure, a U-shape member disposed in an inverted manner on said bar and slidable thereon, and means for securing said member to said cutting knives, said member sliding on and frictionally engaging said bar to impart the corresponding oblique movements to said knives during the cutting and non-cutting strokes thereof.

5. The food slicing apparatus according to claim 4 which includes a second elongated bar substantially coextensive with at least the length of said first-mentioned bar, said second bar being superposed on said U-shape member whereby said last-mentioned member is slidable between and frictionally engages said two elongated bars for controlling the magnitude of the thrust of said cutting blades during the cutting strokes thereof.

6. The food slicing apparatus according to claim 1 in which said last-mentioned means is slidably movable on two portions of said base disposed in spaced relation effectively on opposite sides of said horizontal axis at an angle oblique thereto, and comprises a pair of guide rails disposed in spaced relation on said two base portions at an angle oblique to said horizontal axis of said wire enclosure, each of said members being effectively disposed on one side of said last-mentioned horizontal axis, a pair of members, each attached to certain ends of said knives and slidably movable on one of said guide rails whereby oblique movements are imparted to said knives during the cutting and non-cutting strokes thereof, said members slidably movable on said guide rails from right to left in cutting strokes and from left to right in non-cutting strokes.

7. The food slicing apparatus according to claim 1 which includes said base formed with an opening underneath said wire enclosure and substantially coextensive therewith, said last-mentioned enclosure has a lowermost aperture substantially registering with and positioned above said opening, and a plate is attached to a lowermost portion of said movable means and disposed underneath said enclosure intermediate said opening and aperture when said knives have completed the non-cutting strokes, said plate in said last-mentioned disposition provides a support for said food in said enclosure, said plate moves with said movable means during the cutting strokes movable means so that upon the completion of the cutting strokes thereof said plate is moved from underneath said enclosure to enable substantially the registration of said opening and aperture whereby the sliced food is permitted to drop out of said wire enclosure through said aperture thereof.

8. The food slicing apparatus according to claim 1 which includes an adjustable mount for said knives whereby the tension of the respective knives may be changed from time to time to facilitate the slicing of said food, said mount including a second U-shaped member, a first yoke fixedly attached to an open end of said second U-shape member, a second yoke slidably mounted in a pair of slots provided adjacent a closed end of said second U-shape member, two groups of spacers for mounting said knife blades in spaced relation on said first and second yokes, and adjustable means attached to said second yoke and the closed end of said second U-shape member for slidably moving said second yoke in said slots to vary the distance between said last-mentioned yokes thereby changing the tension of said knives.

9. The food slicing apparatus according to claim 1 in which each of said knives is provided with a wavy cutting edge comprising a plurality of successive arcuate sections, each of said sections being connected with adjacent sections and so proportioned as to accommodate substantially a peripheral portion of said food whereby the surface of said food is expeditiously pierced upon the engagement of said knives therewith.

10. Apparatus for slicing food comprising a base, a pair of pedestals disposed in spaced relation in a horizontal direction on said base, a plurality of wires supported in a vertically spaced relation on said pedestals in parallel relation with said base, said wires being so shaped in a horizontal plane as to constitute an enclosure for said food, and a plurality of knives superposed in vertically spaced relation, said plurality of spaced knives being so positioned on said plurality of spaced wires that each knife is slidably movable between two adjacent wires, said knives being movable from right to left between said wires from a position adjacent one of said pair of pedestals to a position adjacent the other of said pair of pedestals in cutting strokes, said knives being movable from left to right between said wires from the position adjacent said other pedestal to the position adjacent said one pedestal in non-cutting strokes, said pair of pedestals limiting the right-to-left and left-to-right movements of said plurality of knives and thereby continuously maintaining said plurality of knives between said plurality of wires during the cutting and non-cutting strokes as well as upon the completion of the respective last-mentioned strokes.

11. The food slicing apparatus according to claim 10 in which said base includes an opening disposed underneath said wire enclosure and being at least substantially coextensive therewith, said last-mentioned enclosure having a lowermost aperture substantially registering with and positioned above said opening, and a plate attached to a lowermost portion of said plurality of knives and disposed underneath said enclosure intermediate said opening and aperture when said plurality of knives has completed the non-cutting strokes, said plate in said last-mentioned disposition providing a support for the food in said enclosure, said plate moving with said knives from right to left during the cutting strokes so that substantially upon the completion of the respective cutting strokes said plate is entirely moved out from underneath said enclosure to enable substantial registration between said opening and aperture whereby the sliced food in said enclosure is permitted to drop through said last-mentioned registered opening and aperture.

12. Apparatus for slicing food comprising a base having an opening, a pair of pedestals disposed in spaced relation in a horizontal direction on said base, one of said pedestals being formed with a plurality of superposed peripheral grooves, a second of said pedestals being provided with a plurality of superposed spaces corresponding to the spacing of said peripheral grooves on said one pedestal, a plurality of wires superposed in vertically spaced relation above said base and shaped to constitute an enclosure for said food, said enclosure having a lowermost aperture positioned above said base opening and being substantially coextensive therewith, said plurality of spaced wires having substantially diametrically opposite portions disposed in said grooves and spaces whereby said enclosure is supported between said pair of pedestals, a plurality of knives superposed in vertically spaced relation and positioned on said plurality of wires, the numerical dimensions between adjacent grooves on said one pedestal and between adjacent spaces on said second pedestal being so preselected that said wires are disposed in parallel relation with each other and with said base and are spaced to permit each knife of said plurality of knives to move slidably between each two adjacent wires of said plurality of wires, said knives being movable from right to left between said wires from a position adjacent said second pedestal to a position adjacent said one pedestal in cutting strokes, said knives being movable from left to right between said wires from the position adjacent said one pedestal to the position adjacent said second pedestal in non-cutting strokes, said pair of pedestals limiting the right-to-left and left-to-right movements of said plurality of knives and thereby continuously maintaining said plurality of knives between said plurality of wires during the cutting and non-cutting strokes as well as upon the completion of the respective last-mentioned strokes, and a plate attached to a lowermost portion of said plurality of knives and disposed underneath said enclosure intermediate said base opening and enclosure aperture when said plurality of knives is disposed in the position adjacent said second pedestal upon the completion of the non-cutting strokes, said plate in said last-mentioned position providing a support for the food in said enclosure, said plate being movable with said plurality of knives during the cutting strokes so that substantially upon the completion of the respective cutting strokes said plate is entirely moved out from underneath said enclosure to enable substantial registration between said base opening and enclosure aperture whereby the sliced food in said enclosure is permitted to drop through said last-mentioned registered opening and aperture.

References Cited in the file of this patent

UNITED STATES PATENTS

| | | |
|---|---|---|
| 130,544 | Stepp | Aug. 13, 1872 |
| 254,914 | Bonnefin | Mar. 14, 1882 |
| 713,645 | Johnson et al. | Nov. 18, 1902 |
| 944,087 | Gloekler et al. | Dec. 21, 1909 |
| 1,313,753 | Sonnemann | Aug. 19, 1919 |
| 1,670,233 | Boisvert | May 15, 1928 |
| 2,483,763 | Edwards | Oct. 4, 1949 |